Dec. 30, 1947.  E. G. BRISCOE  2,433,422
VINEYARD PLOW
Filed April 28, 1945  2 Sheets-Sheet 1
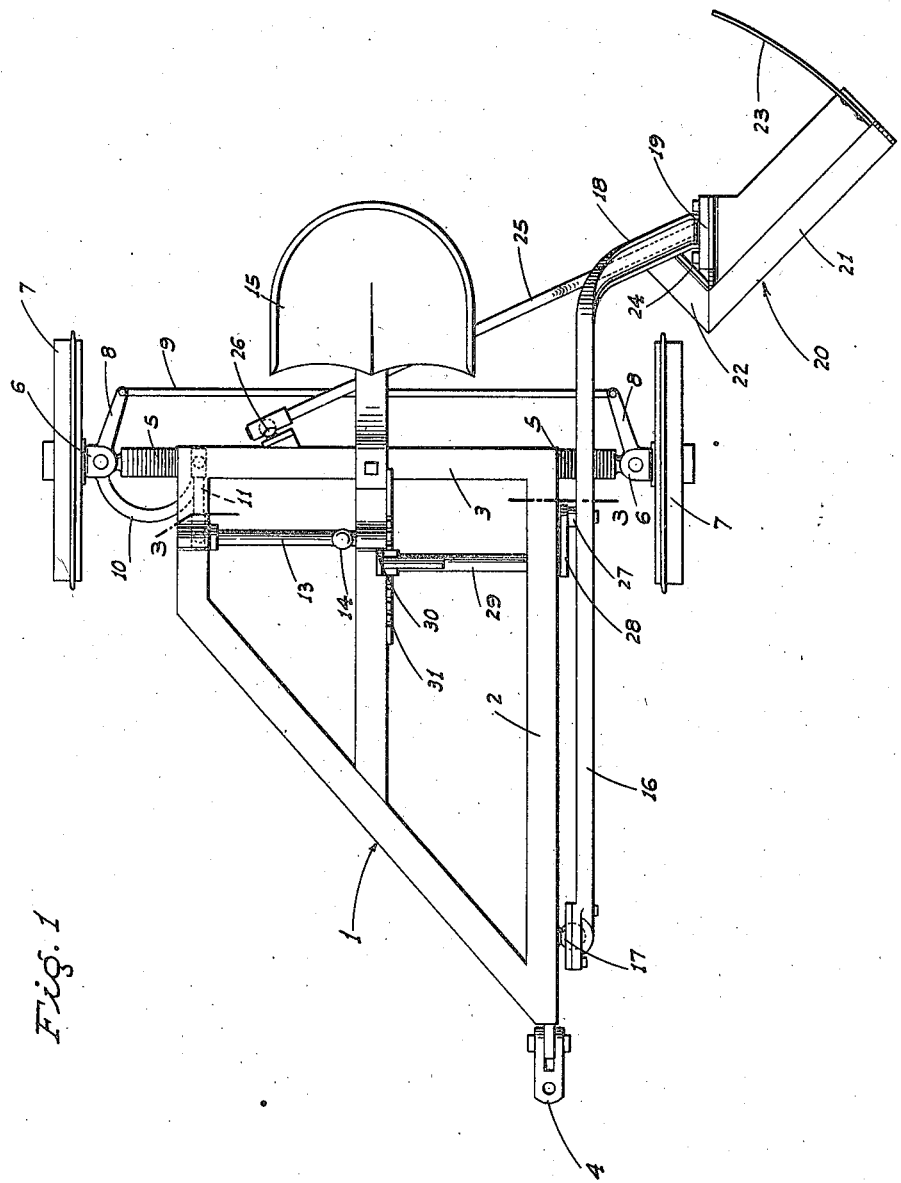
INVENTOR
E. G. Briscoe

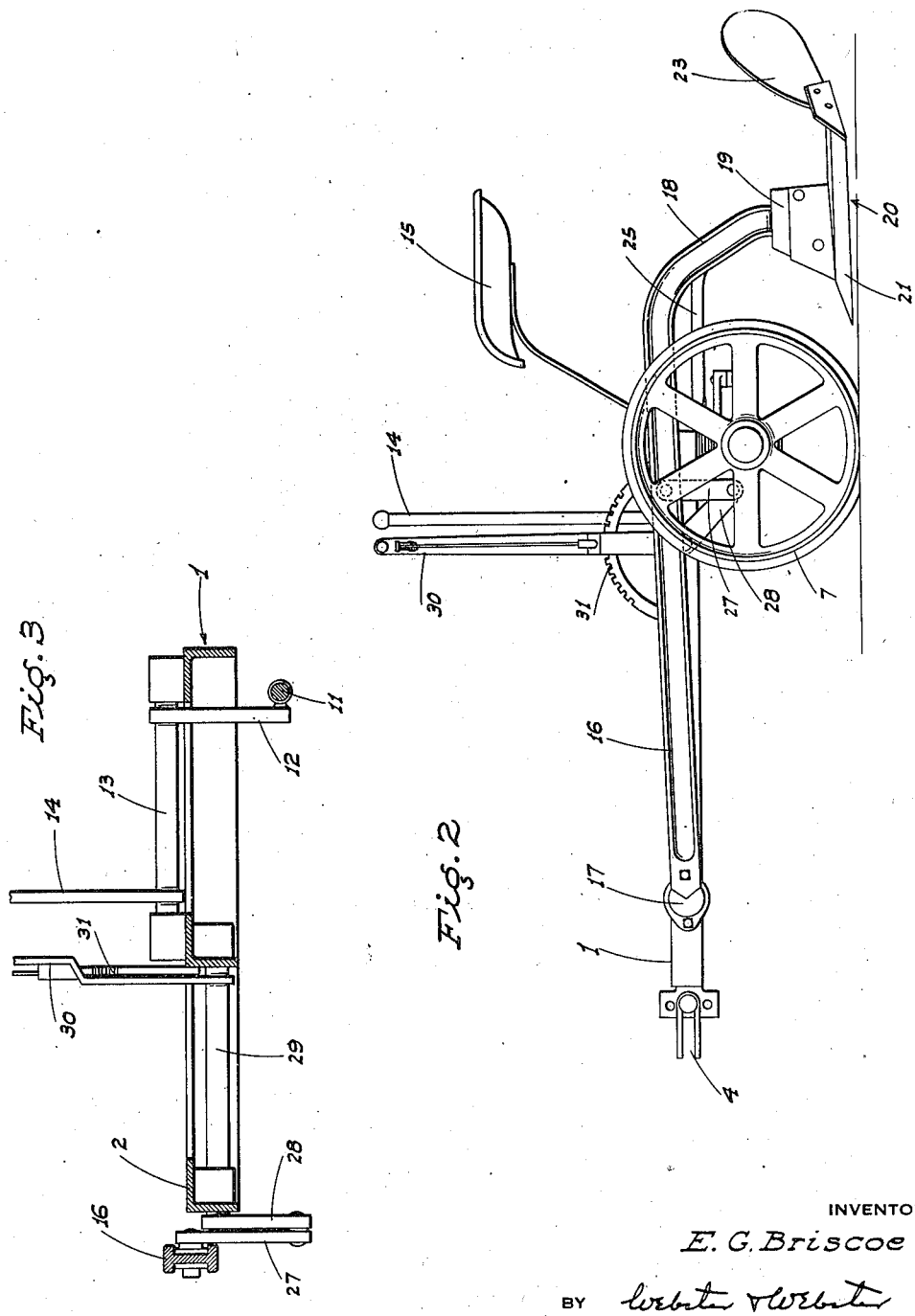

Patented Dec. 30, 1947

2,433,422

UNITED STATES PATENT OFFICE 2,433,422

VINEYARD PLOW

Elmer G. Briscoe, Fresno, Calif.

Application April 28, 1945, Serial No. 590,774

2 Claims. (Cl. 97—137)

This invention relates generally to an improved agricultural implement.

In particular the invention is directed to, and it is an object to provide, a vineyard plow of novel construction; such plow being operative to effectively cultivate between the vines and close to the trunks thereof.

Another object of the invention is to provide a vineyard plow which comprises a wheel-supported frame to which a plow assembly is connected in draft relation; the plow assembly being disposed laterally out from the frame, and the wheels being steerable to control projection of said plow assembly between the vines in a row.

A further object of the invention is to provide a vineyard plow, as above, which includes an offset draft hitch; said hitch being offset to the side of the frame adjacent the plow assembly.

An additional object of the invention is to provide a vineyard plow, as described, wherein the steering of the implement to control projection of the plow assembly between the vines, and adjustment of plow depth, are accomplished manually and selectively by an operator seated on the implement.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a plan view of the improved vineyard plow.

Figure 2 is a side elevation of the plow.

Figure 3 is a cross section on line 3—3 of Fig. 1.

Referring now more particularly to the characters of reference on the drawings, the implement comprises a substantially horizontal frame 1 which includes a straight longitudinally extending side beam 2 and a right-angle rear end beam 3; the frame converging forwardly to the front end of the side beam 2 and there being fitted with an offset hitch 4 which is in direct longitudinal alinement with the side beam 2.

At the rear end thereof and on opposite sides the frame 1 is formed with downwardly and laterally outwardly extending axle portions 5, which carry steering knuckles 6 having outwardly projecting spindles on which ground engaging wheels 7 are journaled. The steering knuckles 6 include knuckle arms 8 connected by a tie rod 9 whereby the wheels 7 are maintained in like steering positions.

One of the steering knuckles 6 is fitted with an arcuate steering knuckle arm 10 which extends inwardly, and which is connected at its rear end by a universally mounted drag link 11. The drag link 11 extends forwardly from the inner end of the steering knuckle arm 10 and connects with the lower end of a radial steering arm 12 which depends from a turnably mounted cross shaft 13 on frame 1 adjacent but short of the rear end of the latter. A steering lever 14 is fixed on and extends radially upwardly from the cross shaft 13 substantially centrally between the sides of the frame 1 and directly ahead of an operator's seat 15 which said frame supports at the rear.

With the above described steering mechanism manual movement of the lever 14 causes steering of the wheels 7, and consequently the implement, in one direction or the other.

A drawbar 16 extends alongside the side beam 2 of frame 1 in adjacent but spaced, substantially parallel relation to said side beam, vertically. The forward end of the drawbar 16 is connected to the side beam 2 adjacent the hitch 4 by means of a ball and socket unit 17 which permits of vertical swinging movement of said drawbar. The drawbar 16 extends rearwardly between the side beam 2 and the corresponding wheel 7 above the axle portion 5, and rearwardly of said wheel the drawbar is formed with a downwardly and rearwardly inclined, laterally outwardly extending plow assembly standard 18. At its lower end the standard 18 is detachably connected by means of a bracket unit 19 with a plow assembly, indicated generally at 20; said plow assembly being V-shaped in plan but having its outermost blade 21 of substantially greater length than the innermost blade 22. The blade 22 is set to ride directly behind the corresponding wheel 7, whereby the blade 21 projects diagonally outwardly and rearwardly relative to said wheel. The blade 21 is fitted at its outer end with a moldboard 23, while the blade 22 includes a moldboard 24.

In order to maintain proper lateral stability of the drawbar 16 without limiting vertical adjustability of the latter, a compression bar 25 is connected, at its outer end, to the bracket unit 19 and thence extends laterally of the implement and somewhat diagonally in a forward direction to connection with the rear end beam 3 by means of a ball and socket unit 26, which is disposed adjacent the side of frame 1 opposite the plow assembly 20. As the seat 15 is relatively elevated, the compression bar 25 is capable of vertical swinging movement.

The structure comprising drawbar 16, compression bar 25, and the plow assembly 20, is vertically adjustable by means of the following mechanism:

A link 27 is pivotally connected between the drawbar 16 intermediate its ends and the lower end of a downwardly and rearwardly inclined radial lever 28 fixed on a cross shaft 29 on the frame 1 adjacent its rear end. A hand lever 30 is fixed in connection with the cross shaft 29 and upstands adjacent the steering lever 14 for ready access by the operator, the hand lever 30 being normally maintained against movement by means of a releasable latching quadrant unit, indicated generally at 31. Upon release of the hand lever 30 and swinging movement thereof in one direction or the other, the drawbar 16, together with the plow assembly 20, is correspondingly vertically adjusted.

When the above described vineyard plow is in use the operator, from seat 15, first manipulates the hand lever 30 to set the plow assembly 20 to the desired working depth. Thereafter, with advance of the implement along a row of vines, the operator manipulates the steering lever 14 so as to steer the implement in a manner to cause the plow assembly to work closely about the trunks of, and between, the vines. In other words, the implement is steered so as to cause the plow assembly 20 to successively shift back and forth laterally of the direction of travel in order to effect the desired cultivation between the vines and about the trunks of the same, but without the plow assembly striking and damaging said trunks.

By reason of the offset hitch 4, which disposes the line of draft very close to the longitudinal plane of the drawbar 16, a substantially straight-line pull is obtained on said drawbar and the supported plow assembly 20.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. An agricultural implement comprising a frame, a pair of transversely spaced steerable wheels supporting the frame adjacent its rear end, means to steer the wheels, a drawbar, a universal joint connecting the forward end of the drawbar to one side of the frame adjacent the front end of the latter, such drawbar extending rearwardly along such side of the frame from the point of connection therewith to a point to the rear of the wheels, a plow assembly mounted on the rear end of the drawbar, such plow assembly being located at a point behind the adjacent wheel and extending in part laterally out from the plane in which the wheel lies, a compression bar connected at one end to the plow assembly, and a universal joint connection between the other end of the compression bar and the back of said frame.

2. An agricultural implement comprising a frame, a pair of steerable wheels supporting the frame adjacent its rear end, means to steer such wheels, a draft hitch connected to the forward end of the frame at one side thereof whereby the draft on the frame is offset to that side of the longitudinal center line of the frame, a drawbar connected to the same side of the frame as that to which the hitch is connected, said drawbar extending from the point of connection with the frame and substantially parallel to that side of the frame and between the frame and one of the wheels to a point to the rear of said one wheel, and a plow assembly connected to the rear end of said drawbar and disposed at a point immediately behind said one wheel and in part projecting laterally out from the plane in which the wheel lies.

ELMER G. BRISCOE.

REFERENCES CITED

The following references are of record in the file of this patent:

UNITED STATES PATENTS

| Number | Name | Date |
|---|---|---|
| 1,285,551 | Baker | Nov. 19, 1918 |
| 1,492,791 | Goldsmith et al. | May 6, 1924 |

FOREIGN PATENTS

| Number | Country | Date |
|---|---|---|
| 109,274 | Australia | of 1939 |
| 524,391 | France | May 12, 1921 |
| 572,351 | France | Feb. 20, 1924 |